United States Patent [19]

Yoshida

[11] Patent Number: 4,599,665
[45] Date of Patent: Jul. 8, 1986

[54] LOCKING DEVICE FOR RECORDER OPERATION MODES

[75] Inventor: Kobun Yoshida, Saitama, Japan

[73] Assignee: Pioneer Electronic Corporation, Tokyo, Japan

[21] Appl. No.: 732,881

[22] Filed: Apr. 24, 1985

Related U.S. Application Data

[63] Continuation of Ser. No. 413,843, Sep. 1, 1982, abandoned.

[30] Foreign Application Priority Data

Sep. 2, 1981 [JP] Japan .................. 56-1304851[U]
Sep. 2, 1981 [JP] Japan .................. 56-1304901[U]

[51] Int. Cl.⁴ .................. G11B 5/54; G11B 21/22
[52] U.S. Cl. .................. 360/105; 360/96.1; 360/96.3
[58] Field of Search .................. 360/93, 96.1–96.6, 360/105; 242/199–201

[56] References Cited

U.S. PATENT DOCUMENTS

| | | | |
|---|---|---|---|
| 3,921,215 | 11/1975 | Asami | 360/93 X |
| 4,165,159 | 8/1979 | Landau | 360/80 |
| 4,206,488 | 6/1980 | Nakayama | 360/96.1 |
| 4,329,720 | 5/1982 | Kodama | 360/137 |

Primary Examiner—A. J. Heinz
Attorney, Agent, or Firm—Sughrue, Mion, Zinn, Macpeak, and Seas

[57] ABSTRACT

A cassette recorder employs a locking device for the mode selection buttons in order to retain selected modes, where the device can release the selected mode by operation of a stop button. An ejector mechanism is also associated with the stop button so that operation of the stop button can effect unlocking of the cassette holding pocket.

5 Claims, 4 Drawing Figures

LOCKING DEVICE FOR RECORDER OPERATION MODES

This is a continuation of application Ser. No. 413,843, filed 9/1/82, now abandoned.

BACKGROUND OF THE INVENTION

This invention concerns a locking device for the operational modes of a tape recorder and, more specifically, to a locking device capable of freely switching each of the operation rods directly.

This invention also concerns a locking and stopping device for the operational modes of a tape recorder, and an ejector for use with such a tape recorder and, more specifically, to an ejector suitable for releasing a lock of the pocket door.

Most tape recorders, for example, so-called radio cassette recorders, i.e., those equipped with radio receivers, are provided with mode operation rods for the selection of various modes such as recording, reproduction, fast forward, rewind, stop and pause respectively.

In the switching operation for specific modes of the tape recorder, the present mode has to be switched to a stop mode before selecting a subsequent mode. For instance, the rewind mode cannot directly be switched to the recording mode, but has to be first switched to the stop mode and, thereafter, to the recording mode.

Conventional locking and stopping devices for the complicated operations of tape recorders employ complicated lever mechanisms, link mechanisms, relay switches and the like, respectively, for the levers pushed upon selecting recording, reproduction, rewind and fast forward modes. This makes the entire mechanism complicated and causes frequent problems. In addition to the above levers and operating rods, the cassette recorder is provided with a pocket for loading the cassette and has further operation rod for opening the pocket.

SUMMARY OF THE INVENTION

In view of the above, this invention enables the switching of operational modes of a tape recorder in one step in an optional order with a simple structure, wherein an elongated lock plate is disposed in the direction perpendicular to the operating direction of the operation rods. An operation rod is locked by being pushed into the lock plate, and the operation rod thus locked can be released by the step of pushing and locking another operation rod.

An object of this invention is to eliminate the foregoing drawbacks in the prior art and provide a locking and stopping device for the operations of a tape recorder which has a simple structure is reliable in operation.

For attaining the above object this invention provides a device comprising an elongate lock plate provided with engagement means corresponding respectively to each of the levers for recording, reproduction, rewind and fast forward, and in which each of the levers is provided with a lock groove, a cam face and a groove, the lock plate being resiliently biased by a spring so as to fit the lock groove, and a stop lever formed with a longitudinal groove and a cam face. The lock plate is further provided with an engagement element corresponding to the stop lever, an engagement element corresponding to a lever interlocked with a detection mechanism, and a switch actuation piece for the ON-OFF operation of a switch.

This invention is adapted to close and, particularly, open the cassette pocket or door without using an exclusive operation rod but by utilizing a mode operation rod, wherein the lock of the door is released by the operation of the operation rod for the stop mode.

DESCRIPTION OF THE PREFERRED EMBODIMENTS

Figure 1:
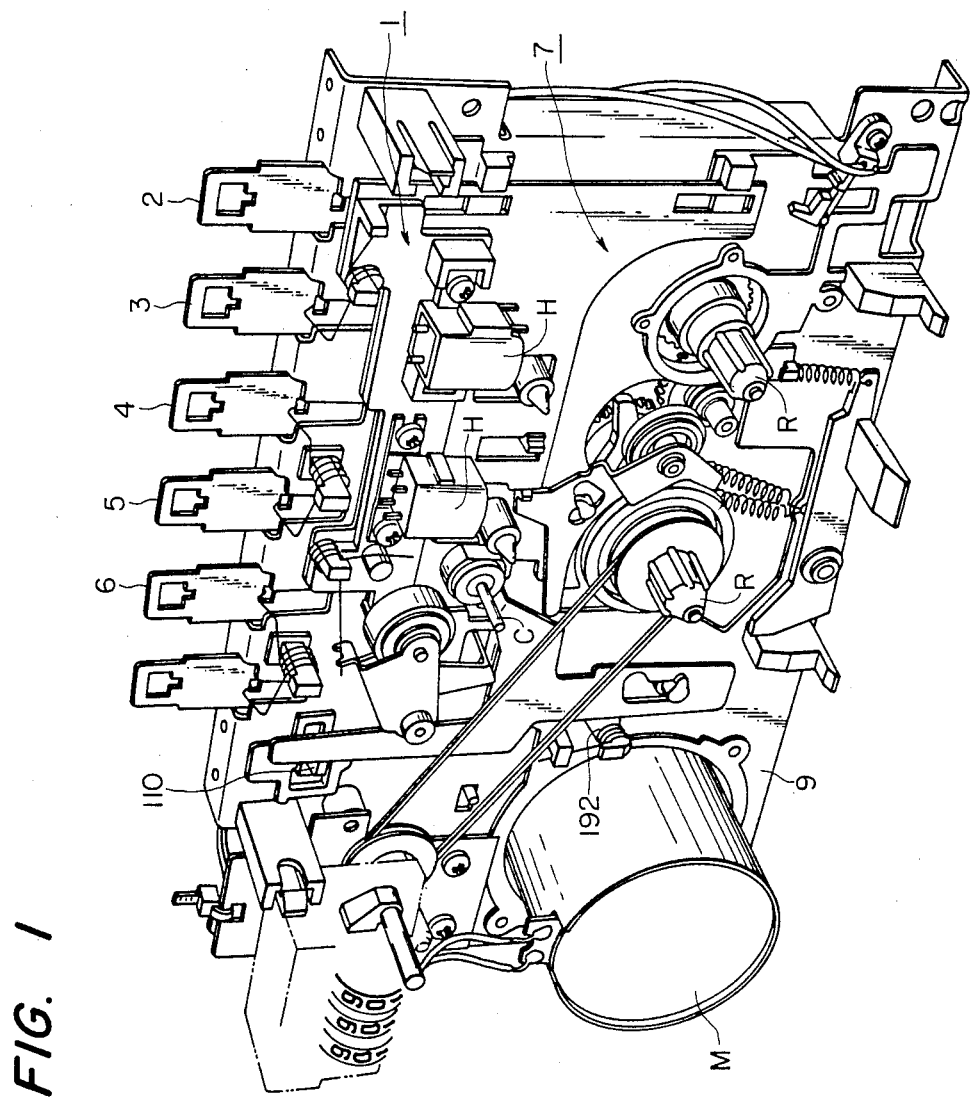
FIG. 1 outlines the arrangement of a cassette recorder according to the invention.

FIG. 1 shows the overall driving mechanism for the tape recorder using the stopping mechanism according to this invention. On a chassis 9 is mounted a drive motor M which drives a capstan C and a wind-rewind shaft R. Transport, stop and other operations are performed on a cassette tape by the co-operation of a recording and reproduction head and an erasing head with a group of levers, such as the recording lever 2, reproduction lever 3, rewind lever 4, fast forward lever 5, stop lever 6 and a pause lever.

Figure 2:
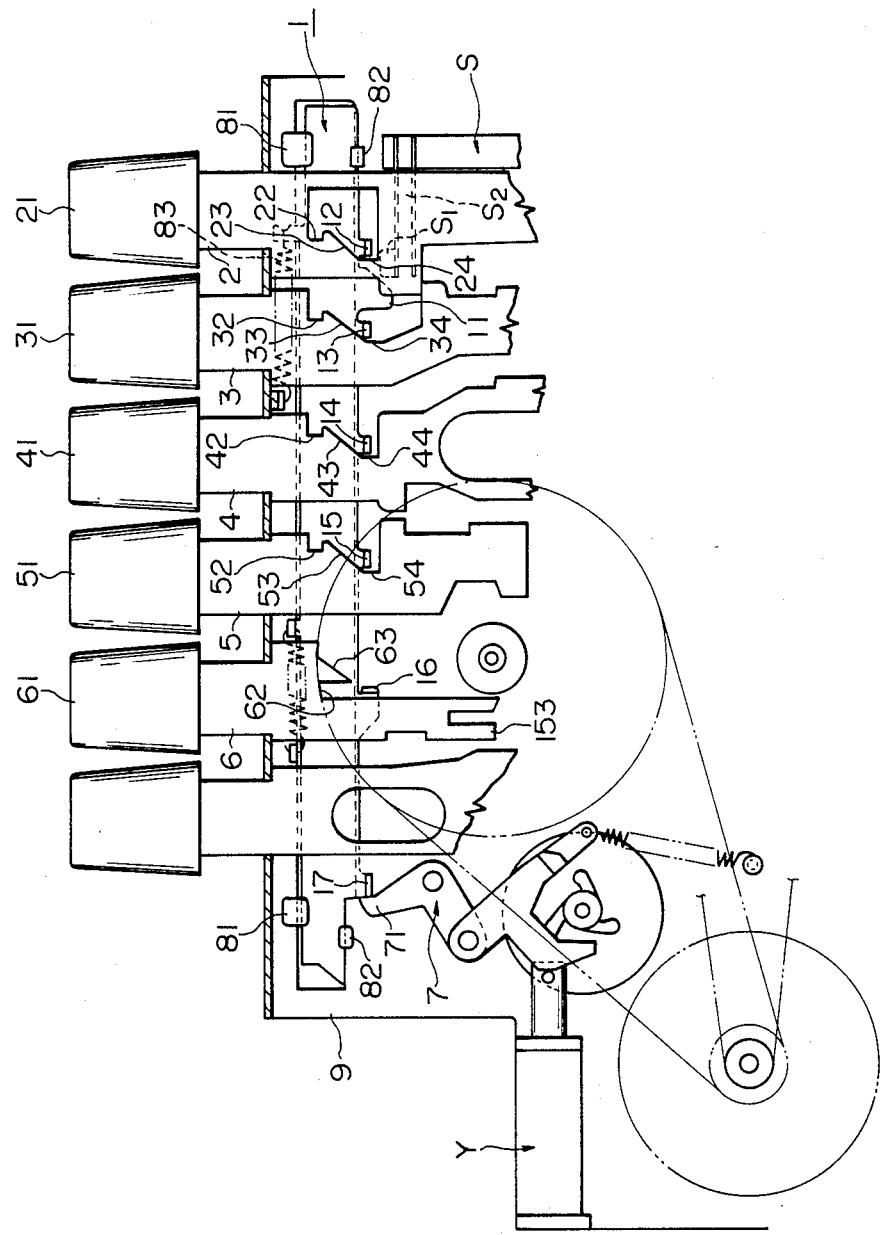
FIGS. 2 and 3 illustrate the locking and releasing operation of the mode selection levers.
Figure 3:
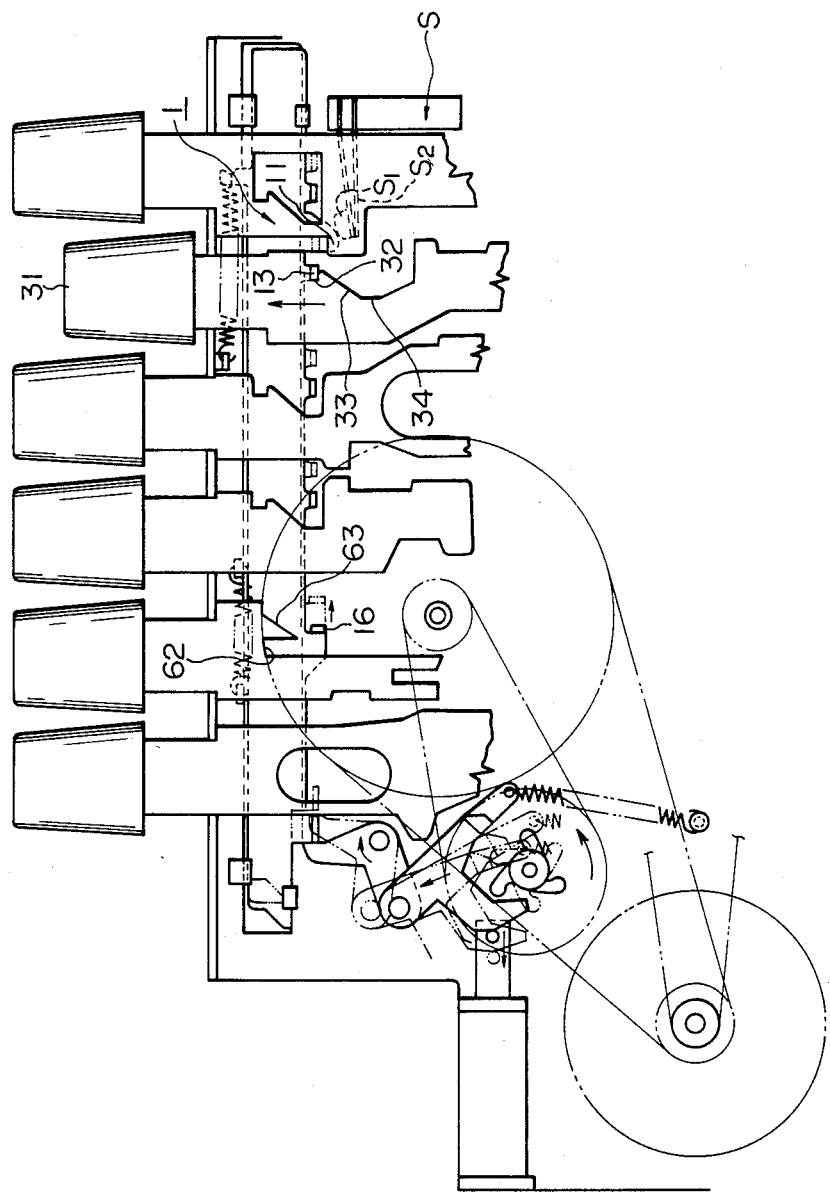

The stopping mechanism will be described in more detail referring to FIGS. 2 and 3.

Each of the levers 2, 3, 4 and 5 is fitted with buttons 21, 31, 41 and 51 respective for finger touch operation, and the recording lever 2, the reproduction lever 3, the rewind lever 4 and the fast forward lever 5 are laterally formed with lock grooves 22, 32, 42 and 52 respectively corresponding to the engagement elements 12, 13, 14 and 15 of a lock plate 1, so as to engage the lock plate 1 and turn-on a switch S upon the actuation of each lever.

The lock plate 1 comprises an elongate plate, which may be composed of two co-operating elongate plates over-laid on each other, and which slidingly moves to the right and left while engaging slide members 81, 82 provided on the chassis 9. The plate is biased leftwardly by a spring 83.

Accordingly, when each of the levers is pressed downwardly each of the engagement elements 12, 13, 14, 15 can be locked into the corresponding lock grooves 22, 32, 42, 52 by resilient force of the spring 83. In this event, a switch actuation piece 11 on the lock plate 1 urges a switch contact $S_1$ of the main switch into contact with a switch contact $S_2$, thereby turning-on a power source.

Upon downward depression of the stop button 61, when the tape recorder is non-operational, the engagement element 16 causes no action since it is moves along a vertical groove 62 of the stop lever with no contact therewith. However, in other modes of recorder operation, the engagement element 16 will slide on the cam face 63 of the lever 6 thereby causing the lock plate 1 to move rightwardly.

Since each of the levers is always biased upwardly by known means, each of the engagement elements 12, 13, 14, 15 will thus be released from the lock grooves 22, 32, 42, 52 by the rightward movement of the lock plate 1, and will return to the upper position. Then, when the stop button is returned to its home position by removing the pressure applied thereto, the lock plate 1 is biased leftwardly by the spring 83, whereby each of the engagement elements 12, 13, 14, 15 for each of the levers 2, 3, 4, 5 is engaged in the corresponding grooves 24, 34, 44, 54 formed at a position to the left of the respective lock grooves 22, 32, 42, 52 along the cam faces 23, 33, 43, 52.

Then, since the lock plate 1 is situated to the left of the actuating position, the switch actuation piece 11 moves leftwardly thereby opening the switch contact S₁ and turning off the switch S.

In the case where a detection mechanism Y is actuated by a finger 71 of a lever 7 and an engagement element 17 corresponding thereto, the lock plate may move rightwardly to turn off the switch S owing to the depression of the stop lever.

As stated above, according to this invention, since the actuation of any of the levers can be locked using only the lock plate, and since the main switch is turned on and off directly by the lock plate, a more reliable operation can be insured, particularly, when operated as an automatic stop mechanism.

This invention further provides the effect of making the structure of the locking and stopping device simple whereby the device can be made compact and with fewer number of component.

Figure 4:
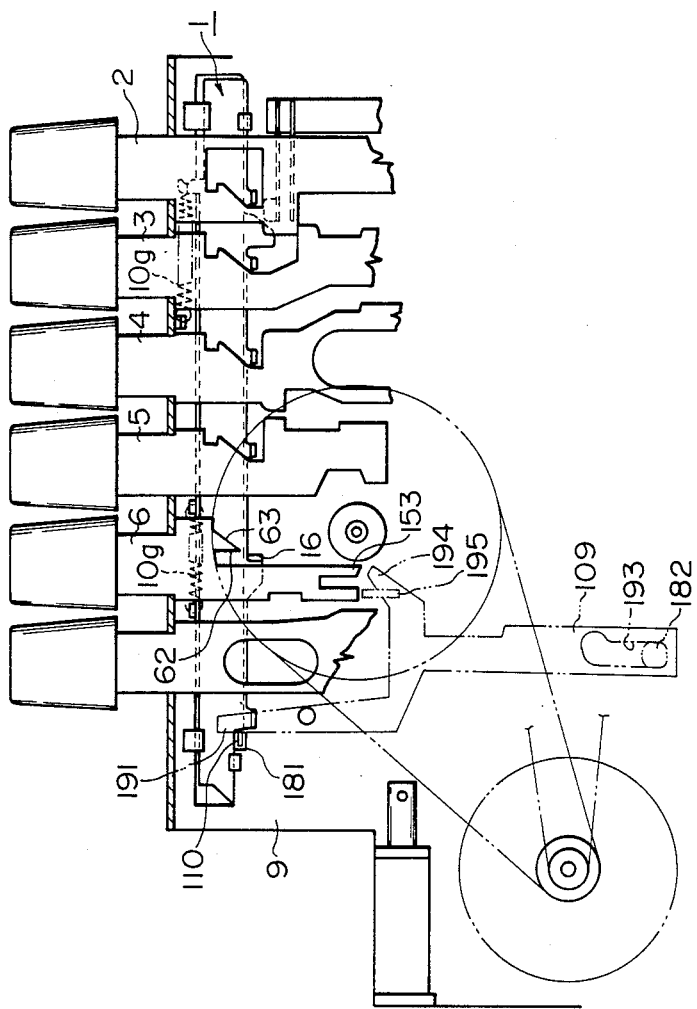
FIG. 4 illustrates the cooperation of the stop mode lever and an eject mechanism.

The operation rod for the stop mode will now be further explained referring to FIG. 4.

The operation rod 6 for the stop mode has no engaging step although being formed with an inclined cam face 63 and with slit 62 for cancelling the action of the engaging projection 16 on the lock plate 10. The lower end of the rod 6 forms a bifurcated portion 153.

An engaging finger 110 is disposed at the end of the lock plate 1 and exposed through a hole 181 to the opposite side of the chassis 9. An end 191 of a door lock plate 109 is contacted with the engaging finger 110 by way of the resilient force of a spiral spring 192 (FIG. 1), so that the door lock plate 109 can move together with the engaging finger 110 upon sliding movement of the lock plate 1. A pin 182 planted on the chassis 9 is exposed through a hole 193 at the lower end of the door lock plate 109. The upper end of the door lock plate 109 is bifurcated into the end 191 as mentioned above and an engaging end 194 that opposes the portion 153 of the stop operation rod 6. A hook 195 of the cassette receiving pocket is engaged with the engaging end 194.

The engagement of the hook 195 is not released by the rotation of the door lock plate 109 but instead by the stroke movement of the plate 109.

Accordingly, when the operation rod 6 for the stop mode is pushed during the stop mode, the portion 153 causes the door lock plate 109 to move linearly guided by the engaging finger 110, pin 182 and hole 193 to thereby release the engagement with the hook 195.

As apparent from the foregoing description, since the ejector for the tape recorder according to this invention is adapted to release the lock made by the hook of the pocket door by causing the door lock plate 109 to move linearly during the stop mode by operating the rod for stop mode, the ejector requires no separate eject operation rod, has a simple structure and can perform reliably.

What is claimed is:

1. In a tape recorder of the type having a stop mode and a plurality of transport modes and generally comprising a chassis, a first lock plate slidable along said chassis and biased from an unlocking side to a locking side, a plurality of transport mode operating rods, a stop mode operating rod, and a tape cassette pocket having a normally locked door and a door lock, the improvement:

wherein each of said transport and stop mode operating rods has an inclined cam face having an upper and lower end, said transport and stop mode operating rods being movable in a vertical linear direction relative to said upper and lower end, and in a direction normal to the sliding direction of said first lock plate; and wherein each of said transport mode operating rods has an engaging step formed at the upper end of said inclined cam face;

said first lock plate including: transport mode engaging projections at positions corresponding to the lower ends of the inclined cam faces of said transport mode operating rods, and a stop mode engaging projection positioned to engage the cam face of said stop mode operating rod; said transport mode engaging projections on said first lock plate being resiliently biased toward the inclined cam faces such that the depression of a transport mode operating rod produces a camming action between a corresponding cam face and transport mode engaging projection to cause a sliding movement of said first lock plate against its bias, said engaging projection being locked into said engaging step by said bias when said transport mode operating rod is fully depressed, said bias causing said first lock plate to slide to the unlocking side, releasing said transport mode operating rod and stopping the tape recorder, when said engaging projection is unlocked from said engaging step by a camming action of said stop mode operating rod cam face and said stop mode engaging projection before said stop mode operating rod is fully depressed in a stopping position; and comprising:

a door lock plate slidable along said chassis, said stop mode operating rod being located at a position confronting a portion of said door lock plate when said stop mode operating rod is fully depressed in the stopping position, such that full depression of said stop mode operating rod engages said door lock plate and causes it to slide in a direction to unlock said door after the tape recorder has stopped.

2. A device as claimed in claim 1, further comprising power switch contacts for said recorder, and wherein said first lock plate includes switch engaging means for closing said power switch contacts by said sliding movement of said first lock plate against said bias, such that said contacts are closed upon the actuation of any of said transport mode operating rods.

3. A device as claimed in claim 1, wherein said stop mode operating rod includes means (62) for preventing engagement of said stop mode operating rod cam face with said stop mode engaging projection when said tape recorder is in said stop mode.

4. A device as claimed in claim 3, wherein said stop mode operating rod further includes a bifurcated end portion (153), wherein said door lock plate (109) is engageable with said end portion, and wherein said door lock is engaged by said door lock plate and released in response to the movement of said door lock plate.

5. A device as claimed in claim 1, said door lock plate being pivotally movable in response to movement of said first lock plate, whereby said door lock plate is set in an angled position when said first lock plate is moved by the depression of any of said transport mode operating rods.

* * * * *